United States Patent
Joyner

(10) Patent No.: US 7,801,402 B2
(45) Date of Patent: Sep. 21, 2010

(54) RECEIVER PHOTONIC INTEGRATED CIRCUIT (RXPIC) CHIP UTILIZING COMPACT WAVELENGTH SELECTIVE DECOMBINERS

(75) Inventor: Charles H. Joyner, Sunnyvale, CA (US)

(73) Assignee: Infinera Corporation, Sunnyvale, CA (US)

( * ) Notice: Subject to any disclaimer, the term of this patent is extended or adjusted under 35 U.S.C. 154(b) by 107 days.

(21) Appl. No.: 12/165,618

(22) Filed: Jun. 30, 2008

(65) Prior Publication Data

US 2009/0092354 A1    Apr. 9, 2009

Related U.S. Application Data

(60) Continuation of application No. 11/688,387, filed on Mar. 20, 2007, now Pat. No. 7,457,496, which is a division of application No. 10/846,336, filed on May 13, 2004, now Pat. No. 7,209,611, and a continuation-in-part of application No. 10/267,331, filed on Oct. 8, 2002, now Pat. No. 7,283,694.

(60) Provisional application No. 60/470,570, filed on May 14, 2003.

(51) Int. Cl.
G02B 6/34     (2006.01)
G02B 6/28     (2006.01)
G02B 6/12     (2006.01)
H04J 14/02    (2006.01)

(52) U.S. Cl. ............................. 385/37; 385/14; 385/24; 398/84; 398/87

(58) Field of Classification Search ....................... None
See application file for complete search history.

(56) References Cited

U.S. PATENT DOCUMENTS

| | | | |
|---|---|---|---|
| 6,553,162 B1 * | 4/2003 | Okayama | 385/37 |
| 2003/0011833 A1 * | 1/2003 | Yankov et al. | 359/34 |
| 2003/0210862 A1 * | 11/2003 | Yankov et al. | 385/37 |

* cited by examiner

*Primary Examiner*—Michelle R Connelly Cushwa
(74) *Attorney, Agent, or Firm*—W. Douglas Carothers, Jr.; Ross M. Carothers

(57) ABSTRACT

A monolithic receiver photonic integrated circuit (RxPIC) chip includes a plurality of optical signal channels together with other active elements integrated on a semiconductor chip, which chips further include a wavelength selective decombiner comprising a supergrating or an Echelle grating which provides for a more compact chip compared to an integrated on-chip arrayed waveguide grating (AWG) functioning as a wavelength selective decombiner.

15 Claims, 10 Drawing Sheets

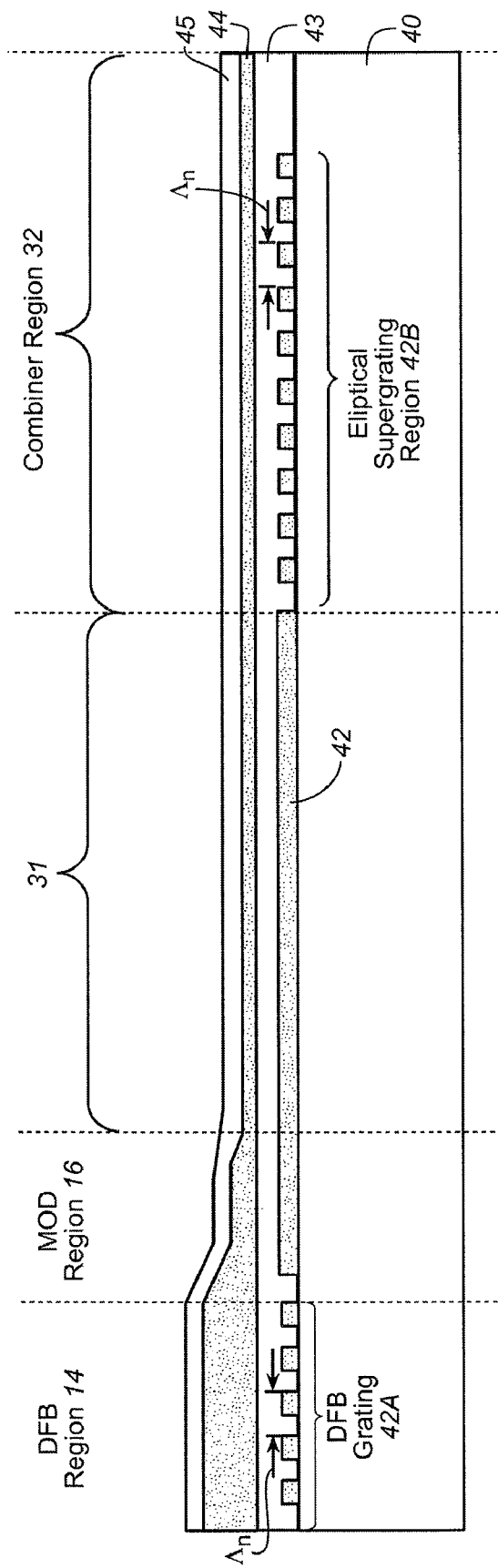
FIG._4

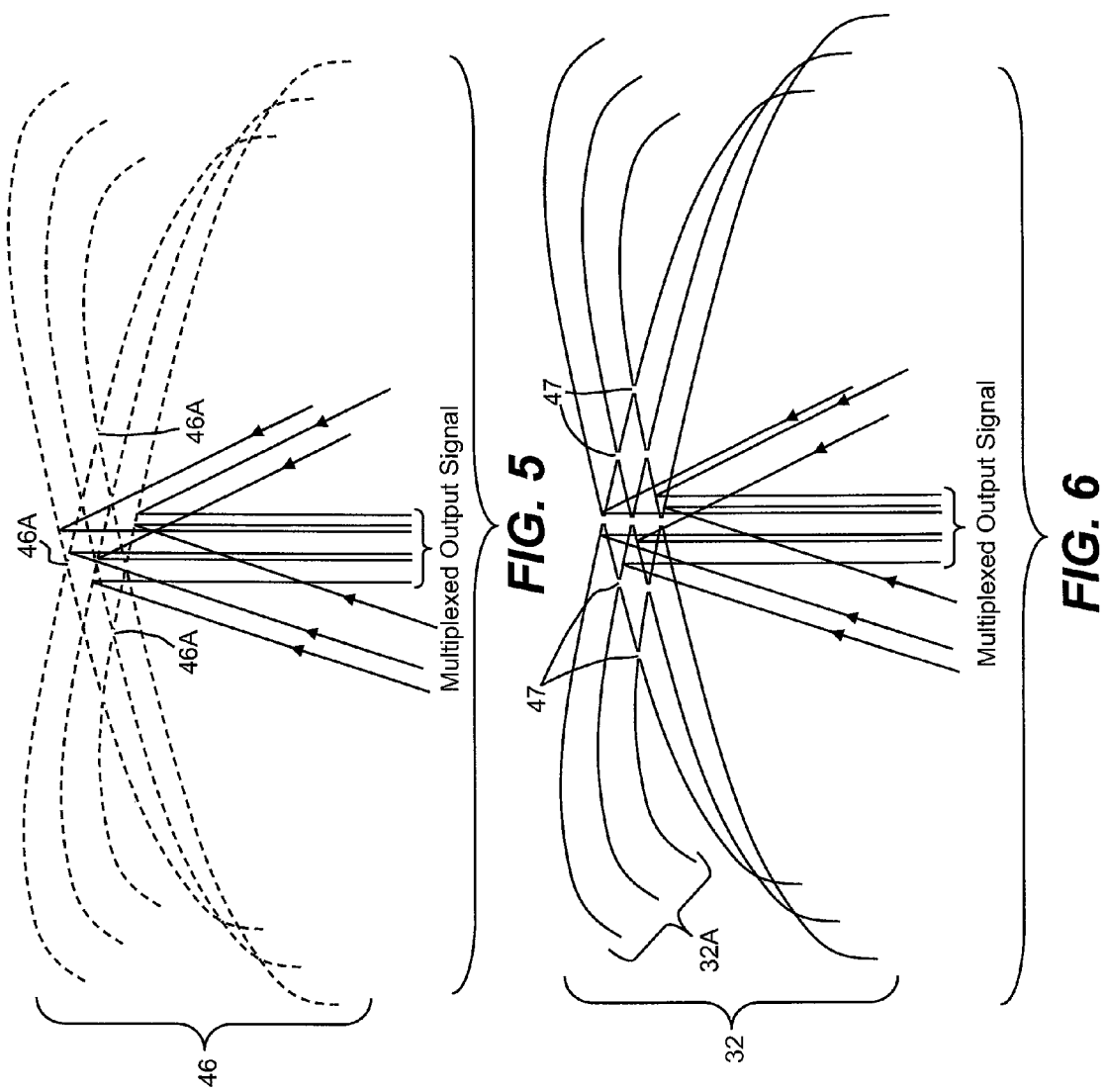

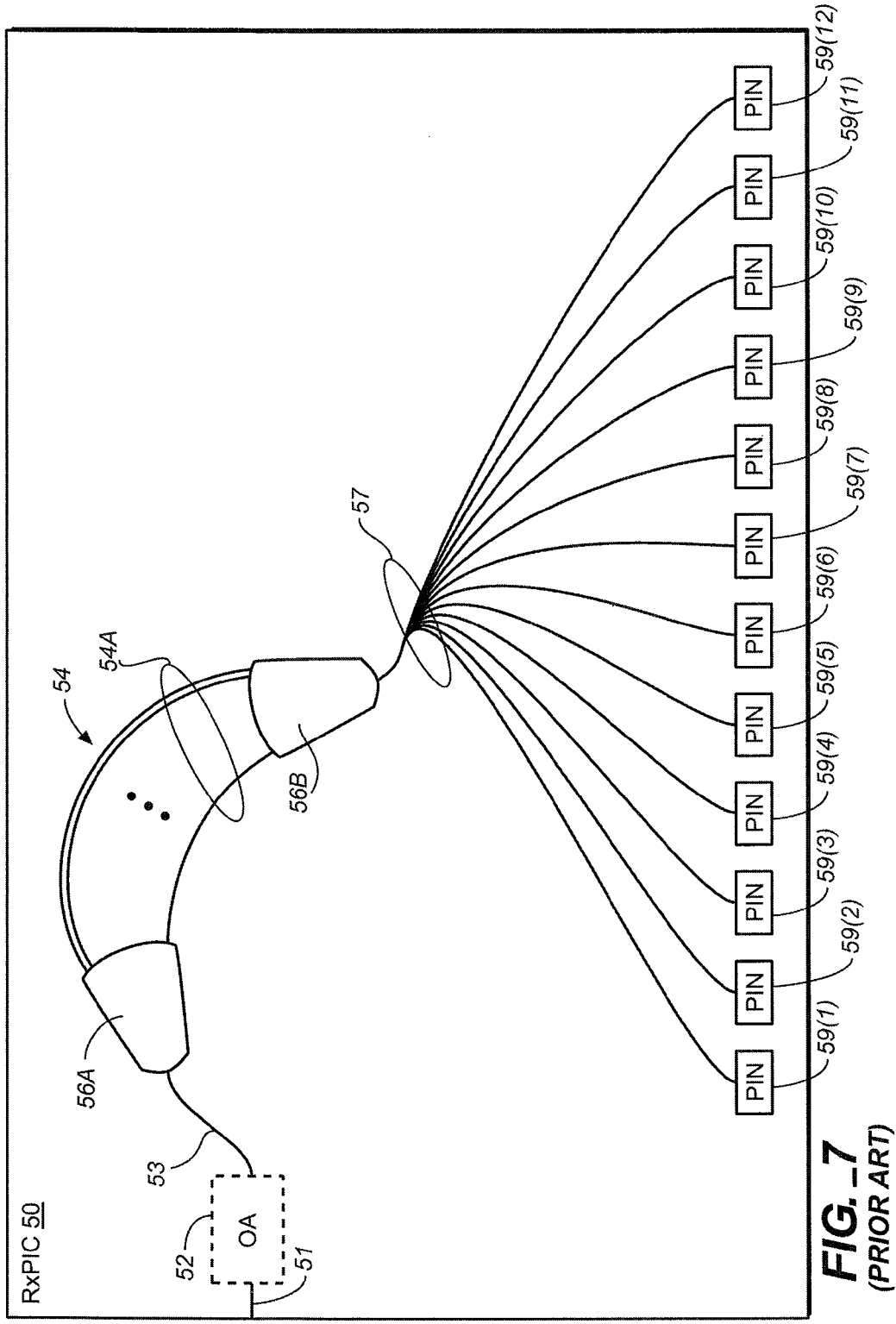
FIG._7 (PRIOR ART)

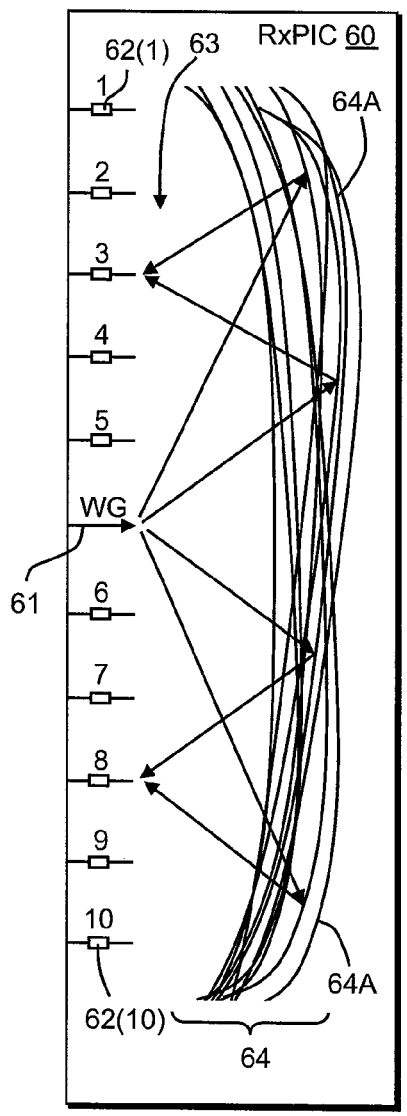
FIG._8
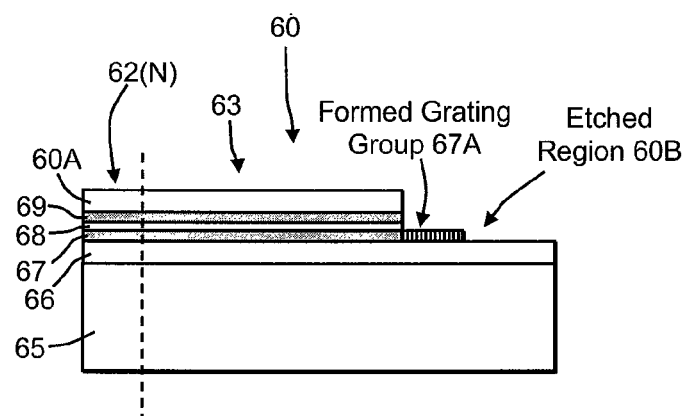
FIG._9

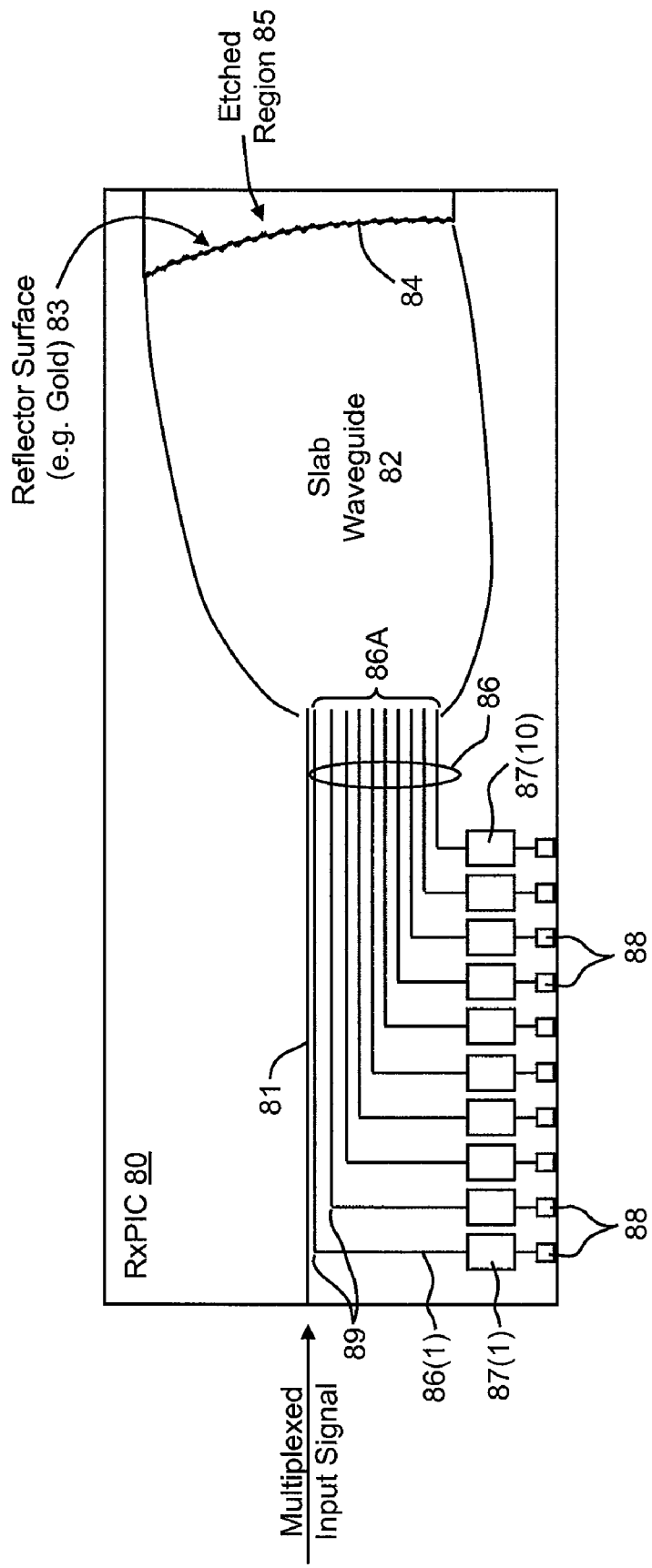
FIG._11

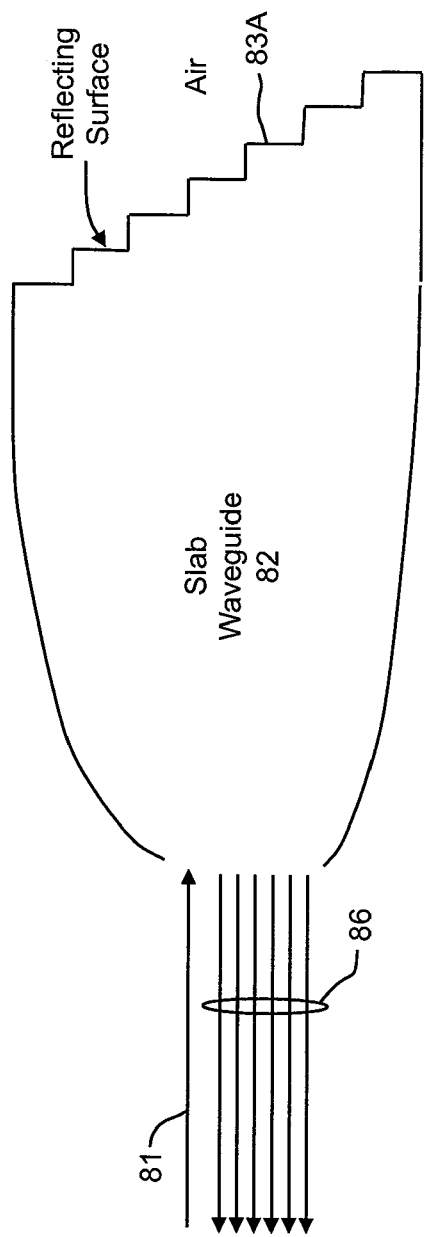
FIG._12
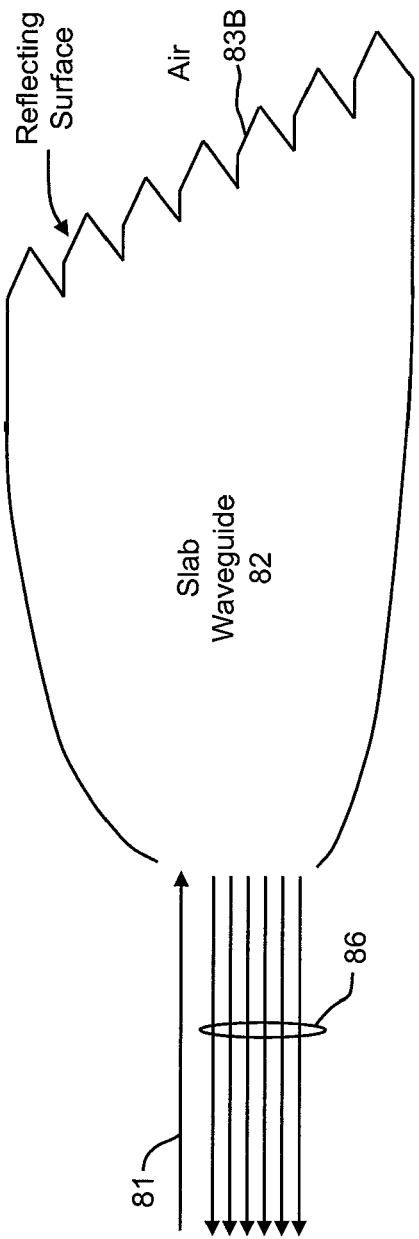
FIG._13

RECEIVER PHOTONIC INTEGRATED CIRCUIT (RXPIC) CHIP UTILIZING COMPACT WAVELENGTH SELECTIVE DECOMBINERS

REFERENCE TO RELATED APPLICATIONS

This application is a continuation of patent application, Ser. No. 11/688,387, filed Mar. 20, 2007 now U.S. Pat. No. 7,457,496 and entitled, RECEIVER PHOTONIC INTEGRATED CIRCUIT (RXPIC) CHIP UTILIZING COMPACT WAVELENGTH SELECTIVE DECOMBINERS, which is a divisional application of patent application, Ser. No. 10/846,336, filed May 13, 2004, now U.S. Pat. No. 7,209,611 which claims priority to provisional application, Ser. No. 60/470,570, filed May 14, 2003, which application is also incorporated herein by its reference, and is also a continuation-in-part of patent applications, Ser. No. 10/267,331, filed Oct. 8, 2002 now U.S. Pat. No. 7,283,694 and entitled, TRANSMITTER PHOTONIC INTEGRATED CIRCUITS (TxPIC) AND OPTICAL TRANSPORT NETWORKS EMPLOYING TxPICs, and published on May 22, 2003 as Pub. No. U.S. 2003/0095737 A1; Ser. No. 10/267,304, filed Oct. 8, 2002 and entitled, AN OPTICAL SIGNAL RECEIVER PHOTONIC INTEGRATED CIRCUIT (RxPIC), AN ASSOCIATED OPTICAL SIGNAL TRANSMITTER PHOTONIC INTEGRATED CIRCUIT (TxPIC) AND AN OPTICAL TRANSPORT NETWORK UTILIZING THESE CIRCUITS, and published on Feb. 19, 2004 as Pub. No. U.S. 2004/0033004 A1, now U.S. Pat. No. 7,116,851 issued Oct. 3, 2006; Ser. No. 10/267,330, filed Oct. 8, 2002 and entitled, TRANSMITTER PHOTONIC INTEGRATED CIRCUIT (TXPIC) CHIP ARCHITECTURES AND DRIVE SYSTEMS AND WAVELENGTH STABILIZATION FOR TxPICs, published on May 22, 2003 as Pub. No. U.S. 2003/0095736 A1, now U.S. Pat. No. 7,079,715 issued Jul. 18, 2006; and Ser. No. 10/267,346, filed Oct. 8, 2002 and entitled, TRANSMITTER PHOTONIC INTEGRATED CIRCUIT (TXPIC) CHIP WITH ENHANCED POWER AND YIELD WITHOUT ON-CHIP AMPLIFICATION, published on May 1, 2003 as Pub. No. U.S. 2003/0081878 A1, now U.S. Pat. No. 7,058,246 issued Jun. 6, 2006, which applications are owned by the common assignee herein and are incorporated herein by their reference.

BACKGROUND OF THE INVENTION

1. Field of the Invention

This invention relates generally to photonic integrated circuits (PICs) and more particularly to multiplexers (MUXes) and demultiplexers (DEMUXes) employed in photonic integrated circuits (PICs). The devices disclosed here are more particularly for use in optical transmitter photonic integrated circuits (TxPICs) and optical receiver photonic integrated circuits (RxPICs) having an integrated on-chip optical combiner of the wavelength selective type, in particular, an elliptical supergrating MUX or DEMUX or a Echelle grating MUX or DEMUX, in lieu of an arrayed waveguide grating (AWG) MUX or DEMUX.

2. Description of the Related Art

The employment of monolithic photonic integrated circuits (PICs), also sometimes referred to as planar lightwave circuits (PLCs), are on the rise in deployment in optical telecommunication systems. These devices provide the integration of both active and passive optical components on a single substrate and are integrated with other optical components to form a multi-functional optical device for use in such systems. The gravitation to PICs is strong because it leads to utility of providing an entire system function, let alone a component function, in a single chip in a single package. Compared to the deployment of discrete optical components, such monolithic PIC chips can significantly reduce the size of optical components necessary in the optical system, albeit in a transmitter photonic integrated circuit (TxPIC) or a receiver photonic integrated circuit (RxPIC), for example, as well as significantly reduce the overall costs in a system. Examples of recent advanced TxPICs and RxPICs are disclosed in U.S. patent applications, Ser. Nos. 10/267,331; 10/267,304; 10/267,330; and 10/267,346, supra.

The size of a TxPIC InP-based chip having ten signal channels that comprise an array of ten laser sources, such as, for example, DFB lasers, and an array of corresponding electro-optic modulators, such as, for example, electro-absorption modulators (EAMs), and a wavelength selective combiner in the form of an arrayed waveguide grating (AWG) is about 4 mm by 4.5 mm. It would be desirable to reduce the size of such chips while simplifying the combiner structure and reducing its on-chip insertion losses.

One such candidate for an on-chip combiner is the elliptical supergrating MUX and DEMUX. An example of this type of device is disclosed in the article of Yankov entitled, "Multiwavelength Bragg Gratings and Their Application to Optical MUX/DEMUX Devices, *IEEE Photonics Technology Letters*, Vol. 15(3), pp. 410-412, March 2003 as well as in U.S. patent application publication No. 2003/0210862, published Nov. 13, 2003. Also, in particular the elliptical supergrating DEMUX is illustrated in U.S. patent application publication No. 2004/0036933, published Feb. 26, 2004 which discloses a so-called planar holographic multiplexer/demultiplexer comprising a series of curved or elliptical gratings that reflect different wavelengths and combines them at a predetermine output or input position. These gratings are referred to as holograms in the context that sets of such gratings being independently wavelength selective for a particular peak wavelength among other wavelengths in a multiplexed output and provide refractive index modulation and reflection of a selected peak wavelength This publication also cites the previous work of Henry et al. entitled, "Four-Channel Wavelength Division Multiplexers and Bandpass Filters Based on Elliptical Bragg Reflectors", *Journal of Lightwave Technology*, Vol. 8(5), pp. 748-755, March, 2003 and in U.S. Pat. No. 4,923,271 which discloses a series of Bragg reflectors for reflecting multiple wavelengths from or to a central point of the combiner or decombiner. It is pointed out in publication No. 2004/0036933 that the Henry device has the disadvantage of not being scalable to high channel count because, since the gratings are spatially separated and will increase significantly with the number of added channels so that the device size becomes unyielding as well as its functionality significantly deteriorates. Publication '933 also mentions that in such two-dimensional devices, there may be the problem of intersection in the grating reflection field of the intersection of gratings of the supergrating to cross one another at intersections since the groups of subgratings are designed for different wavelengths. Moreover, if dashed lines are employed for the gratings, the spacing between dashes may be varied so that the reflection coefficient is enhanced and potential destructive interference (crosstalk) between intersecting gratings of different sets can be minimized. In other words, this destructive interference can be reduce to some extent by diminishing the overlap of the holograms or sets and this can be carried out by using dashed or dotted line gratings in the different sets. However, it is unclear how that might be successfully accomplished.

Another candidate is the Echelle grating for which much work has been published including, as examples, U.S. Pat. Nos. 5,206,920; 6,339,662; 6,141,152; and U.S. published patent application, Publication No. 2002/0081061, as well as the article of Janz et al. entitled, Planar Waveguide Echelle Gratings in Silica-On-Silicon", *IEEE Photonics Technology Letters*, Vol. 16(2). pp. 503-505, February, 2004.

While some of these publications indicate that these candidates can be used in photonic integrated circuits (PICs), such as in Publication No. '933 at page 6, paragraph, there is no indication or teaching as to how this might be affected or accomplished.

SUMMARY OF THE INVENTION

According to this invention, a monolithic transmitter photonic integrated circuit (TxPIC) chip and a monolithic receiver photonic integrated circuit (RxPIC) chip include a plurality of optical signal channels together with other active elements integrated on a semiconductor chip or chips, which chips further include an optical combiner or decombiner that is a wavelength selective comprising a supergrating or an Echelle grating which provides for a more compact chip compared to an integrated on-chip arrayed waveguide grating functioning as a wavelength selective combiner or decombiner.

According to one embodiment of this invention, a monolithic receiver photonic integrated circuit (RxPIC) chip comprises an integrated wavelength selective decombiner for receiving a multiplexed multi-wavelength signal of N signal channels on an input waveguide to the combiner where the combiner is a elliptical supergrating. There is also a plurality of integrated N photodetectors on the RxPIC chip, each optically coupled to receive a respective demultiplexed channel signal from the supergrating for producing an electrical signal of a respective optical channel signal. In another embodiment, the integrated decombiner may be an Echelle grating.

BRIEF DESCRIPTION OF THE DRAWINGS

In the drawings wherein like reference symbols refer to like parts:

FIG. 4 is a side longitudinal elevation of one of the signal channels of the TxPIC chip taken along the line 4-4 of FIG. 2 illustrating the grating layer in the TxPIC chip for forming all gratings.

FIG. 5 is a first alternative embodiment of the supergrating embodiment shown in FIG. 3.

FIG. 6 is a second alternative embodiment of the supergrating embodiment shown in FIG. 3.

FIG. 7 is a plan view of a recently developed RxPIC chip that is disclosed in at least one of the previously incorporated applications and utilizes an array waveguide grating (AWG) as an integrated demultiplexer.

FIG. 8 is a plan view of a RxPIC chip utilizing an integrated elliptical supergrating as an on-chip demultiplexer comprising this invention.

FIG. 9 is a side elevation of the RxPIC chip of FIG. 8.

FIG. 11 is a plan view of a RxPIC chip utilizing an integrated Echelle grating as an on-chip demultiplexer comprising this invention.

FIG. 12 is a detailed view of a first type of grating that may be employed in the embodiments of FIGS. 10 and 11.

FIG. 13 is a detailed view of a second type of grating that may be employed in the embodiments of FIGS. 10 and 11.

DETAILED DESCRIPTION OF THE INVENTION

Figure 1:
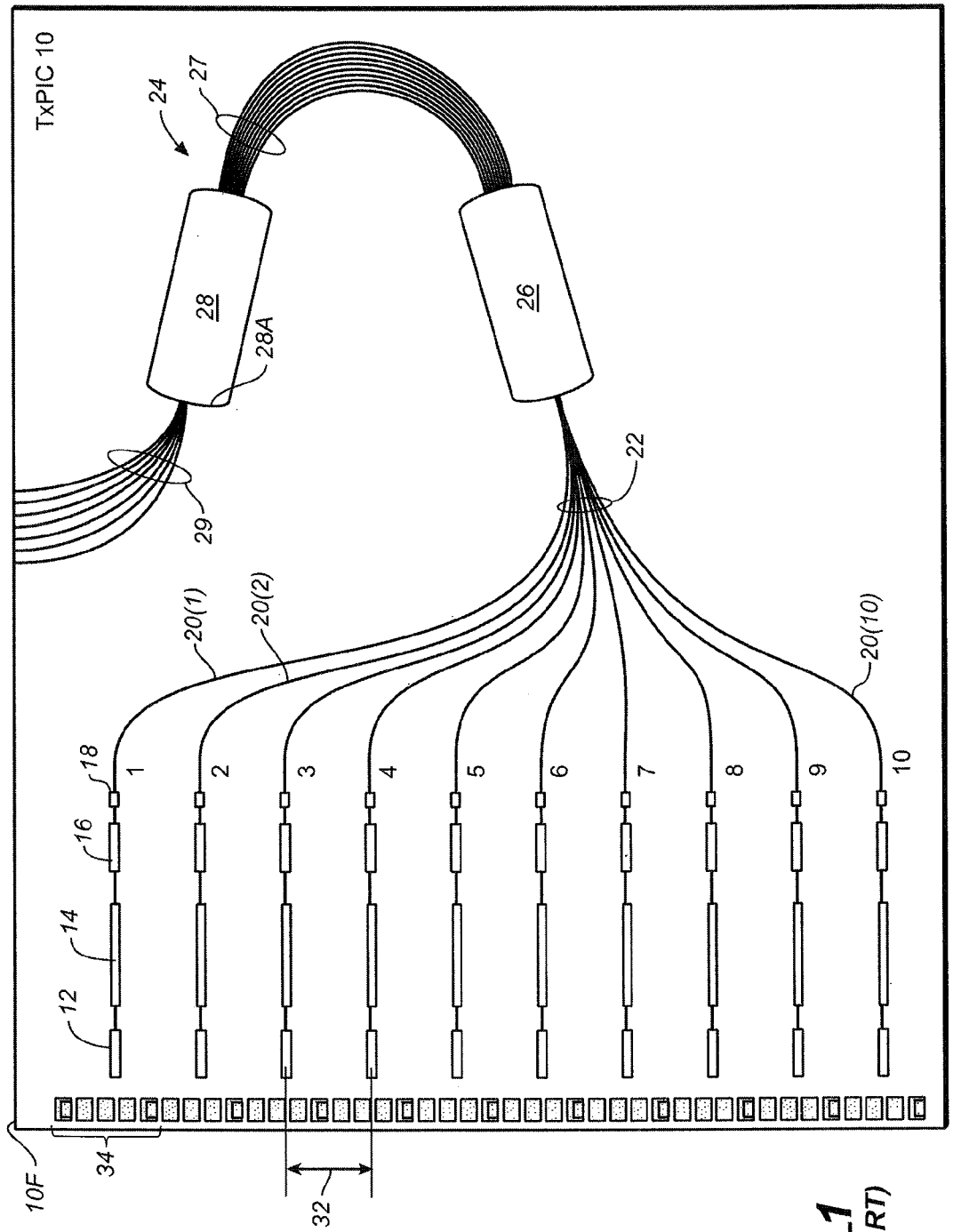
FIG. 1 is a plan view of a recently developed TxPIC chip that is disclosed in at least one of the previously incorporated patent applications and utilizes an array waveguide grating (AWG) as an integrated multiplexer.

Reference is now made to the monolithic transmitter photonic integrated circuit (TxPIC) chip illustrated in FIG. 1. TxPIC chip 10 may be an InP-based chip, the structural details of which are disclosed in U.S. patent applications, Ser. Nos. 10/267,331 and 10/267,346, supra. As shown in FIG. 1, monolithic TxPIC chip 10 comprises groups of integrated and optically coupled active and passive components including an integrated array of laser sources 14, such as DFB semiconductor lasers or DBR semiconductor lasers. Each laser source 14 operates at a different wavelength, $\lambda_1$-$\lambda_N$, from one another where the group of wavelengths provides a wavelength grid approximating a standardized wavelength grid, such as the ITU wavelength grid. The laser source wavelength grid is provided to have, as best as possible, a uniform or periodic channel wavelength pitch as well as a uniform channel width and with signal channel spacing set to, for example, 25 GHz, 50 GHz, 100 GHz or 200 GHz.

At the rear extent of laser sources 14, integrated rear photodetectors 12 may be provided, which are optional. Photodetectors 12 may be, for example, PIN photodiodes or avalanche photodiodes (APDs). Laser sources 14 may be directly modulated or may be operated CW and are provided with an associated external electro-optic modulator 16 as shown in the configuration of FIG. 1. Thus, the CW outputs of laser sources 12 are optically coupled to respective electro-optic modulators 16. Such light intensity modulators 16 may be electro-absorption modulators (EAMs) or Mach-Zehnder modulators (MZMs) as detailed in patent application, Ser. No. 10/267,331, supra, but EAMs are preferred for operation here in conjunction with DFB laser sources. Modulators 16 each apply an electrical modulated signal to the CW light received from laser sources 14 producing a plurality of optical modulated signals of different wavelengths for transmission on an optical link in an optical transmission network. The modulated outputs from each modulator 16 may be optically coupled to a respective front photodetector 18. The on-chip deployment of photodetectors 18 is optional. Alternatively, photodetectors 18 may also be fabricated off-axis of the laser source output by means of an on-chip optical tap to provide a small portion of the modulated output directed from the main optical channel path to the offset photodetector. Front photodetectors 18 may also be PIN photodiodes or avalanche photodiodes (APDs). Photodetectors 12 and 18 may also be employed together to monitor the output power or operational wavelength from the respective laser sources 14. Alternatively or in addition, photodetectors 18 may also function as variable optical attenuators (VOAs) under negative bias in order to selectively adjust modulated source output power to equalize the optical output power across all of the laser sources 14 thereby providing on-chip pre-emphasis. Further, alternatively or in addition, photodetectors 18 may be employed as on-chip semiconductor optical amplifiers (SOAs) under positive bias. Photodetectors 18 functioning as VOAs or SOAs provide for pre-emphasis across the modulated source array. Also, as well understood in previously incorporated patent applications herein, photodetectors 12 and 18, laser sources 14 and modulators 16 are electrically isolated from one another. Also, as a further embodiment, a different frequency tone may be applied to each photodetector 18 to provide for laser source tagging or identification as described and taught in U.S. patent application, Ser. No. 10/267,330, supra.

As indicated above, and as explained in more detail in patent application, Ser. No. 10/267,331, supra, the modulated optical signal outputs of modulators 16, via front photodetectors 18, are respectively coupled to an on-chip wavelength selective combiner, shown here as an arrayed waveguide grating or AWG 24 via N optical input waveguides 22, equal to the number of N laser source/modulator combinations which are also referred to as N signal channels. In FIG. 1, there is a plurality of N-equal-10 channels on TxPIC chip 10. There may be less than N=10 channels formed on chip 10 or there may be more than N=10 channels formed on chip 10.

Also, it should be noted that the output capability of each laser source (DFB or DBR) is a sensitive function of the detuned gain peak, or equivalently the PL wavelength of the active region, from the designed laser source grating wavelength. Detuning can be defined as the difference in wavelength between the room temperature PL of the active region formed in the TxPIC and the designed operating wavelength the laser source as dictated by the periodicity, $\Lambda$, of the laser source grating. Performance gains over temperature can be obtained by designing the laser source grating with respect to gain peak such that alignment between the two improves at higher temperature operation.

As already indicated above, each signal channel is typically assigned a minimum channel spacing or bandwidth to avoid crosstalk with other optical channels. For example, 50 GHz, 100 GHz or 200 GHz are common channel spacings between signal channels. The physical channel spacing or center-to-center spacing 32 of the signal channels may be 100 µm, 200 µm, or 250 µm to minimize electrical or thermal cross-talk at higher data rates, for example, of 10 Gbit per second or greater, and facilitate routing of interconnections between bondpads 34 of multiple PIC optical components or elements formed on the chip. Although not shown for the sake of simplicity, bonding pads may be provided in the interior of PIC chip 10 to accommodate wire bonding to particular on-chip electro-optic components in addition to chip-edge bonding pad groups 34.

Referring again to optical combiner comprising an AWG 24, the respective modulated outputs from signal channels are coupled into optical waveguides 20(1) to 20(10) to the input of AWG 24 as shown in FIG. 8. AWG 24 comprises an input free space region 26 coupled to a plurality of diffraction grating waveguides or arms 27 which are coupled to an output free space region 28. The multiplexed optical signal output from AWG 24 is provided to a plurality of output waveguides 29 which comprise output verniers along the zero order Brillouin zone at output face 28A of free space region 28. Output waveguides 29 extend to chip output facet 10F of TxPIC chip 10 where a selected vernier output 29 may be optically coupled to an output fiber (not shown). The deployment of multiple vernier outputs 29 provides a means by which the best or optimum output from AWG 24, or for any other optical signal combiner for that matter, may be selected by determining which vernier has the best match of the wavelength grid passband of AWG 24 for the established wavelength grid of channel signals provided from the array pairs of laser sources/modulators. Seven vernier outputs 29 are shown in FIG. 1. It should be realized that any number of such vernier outputs may be utilized. Also, the number of such vernier outputs may be an odd or even number.

In operation, AWG 24 receives N optical channel signals, $\lambda_1$-$\lambda_N$, from coupled input waveguides 22 which propagate through input free space region 26 where the wavelengths are distributed into the diffraction grating arms or waveguides 27. The diffraction grating arms 27 are plurality of grating arms of different lengths, by $\Delta L$, from adjacent waveguides or arms, so that a predetermined phase difference is established in arms 27 according to the wavelengths $\lambda_1$-$\lambda_N$. Due to the predetermined phase difference among the wavelengths in grating arms 27, the focusing position of each of the signals in grating arms 27 in output free space region 28 are substantially the same so that the respective signal wavelengths, $\lambda_1$-$\lambda_N$, are focused predominately at the center portion or the zero order Brillouin zone of output face 28A. Verniers 29 provide various passband representations of the multiplexed signal output from AWG 24. Higher order Brillouin zones along output face 28A receive repeated passband representations of the multiplexed signal output but at lower intensities. The focus of the grating arm outputs to the zero order Brillouin zone may not be uniform along face 28A comprising this zero order due to inaccuracies inherent in fabrication techniques employed in the manufacture of TxPIC chip 10. However, with multiple output verniers, an output vernier can be selected having the best or optimum combined signal output in terms of power and strength.

Chip 10, as well as chips disclosed in other embodiments herein, is preferably fabricated using MOCVD with a InP-based regime and the active region of chip 10 may be comprised of InGaAsP ("PQ") or AlInGaAs ("AQ"). The active region may be a single or multiple layer configuration and is preferably a multiple quantum well region. Also, laser sources 14 are positively detuned, e.g., in the case of DFB lasers, the grating pitch of the feedback grating of the respective DFB lasers are chosen such that the laser operates on the longer wavelength side of the gain peak or PL peak of the active region. This detuning provides for laser performance to be substantially uniform over a wider wide temperature range, in particular, the laser gain is maintained or actually increases some with increasing operating or ambient temperature. Laser sources 12 may be fabricated to operate at a positive detuned wavelength, for example, in the range of about 25 nm to about 40 nm from the gain peak. In the case of using electro-absorption modulators (EAMs) as modulators 16, the DFB laser 14 detuned transmission wavelength is close to the absorption edge of the modulator active waveguide core insuring optimal wavelength compatibility between laser sources 14 and corresponding EAMs 16 without significantly degrading the performance of the laser sources due to the application of positive detuning.

In addition, chip 10 may include strip heaters (not shown) formed adjacent to or in close proximity to each laser source 12. These heaters are employed to fine tune the operating wavelengths and, therefore, the resultant operational wavelength of laser sources 14 in the laser source array.

Figure 2:
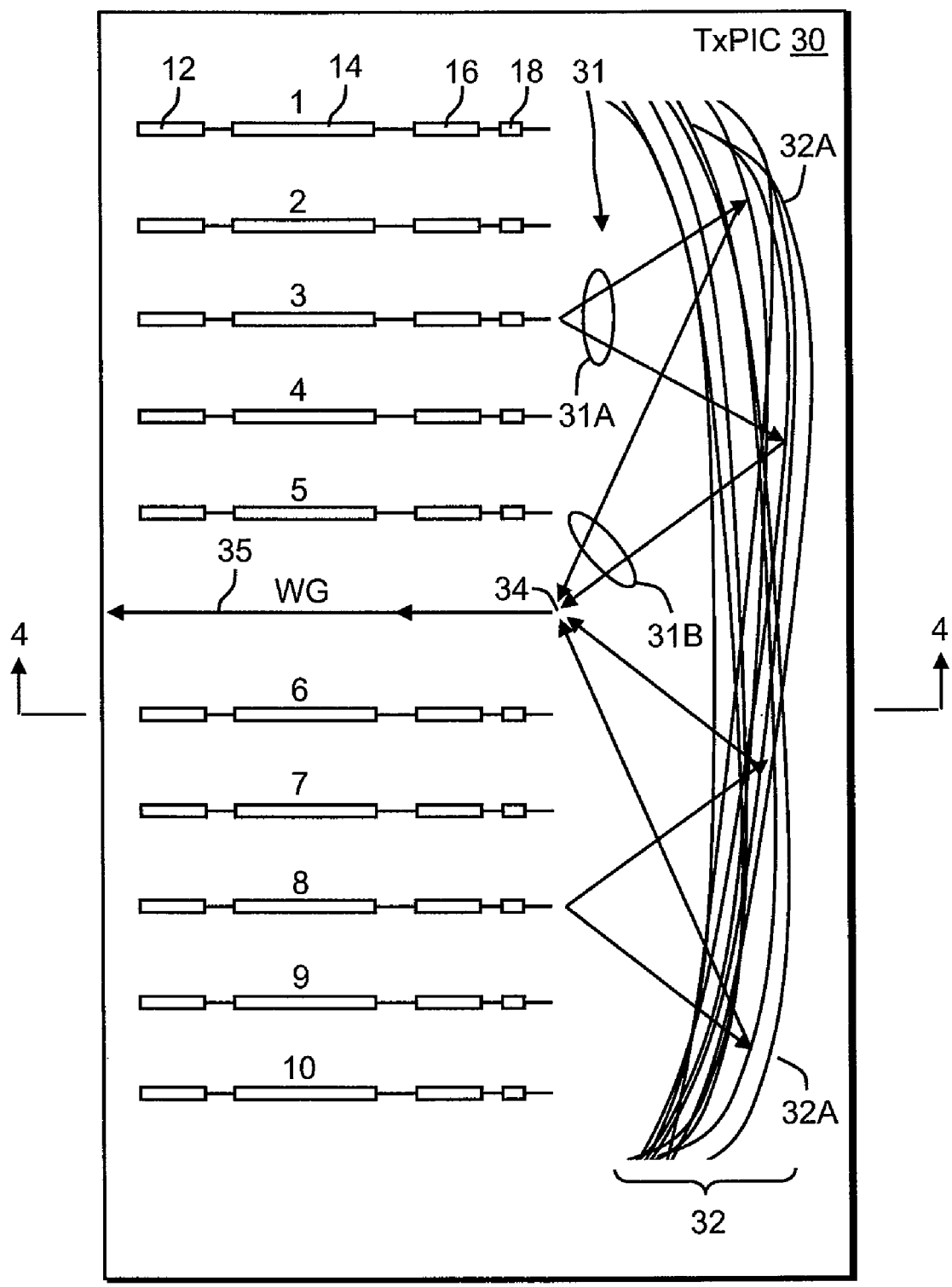
FIG. 2 is a plan view of a TxPIC chip utilizing an integrated elliptical supergrating as an on-chip multiplexer comprising this invention.

Reference is now made to FIG. 2 which discloses a TxPIC chip 30 utilizing a supergrating 32 as the optical signal combiner comprising this invention. Chip 30 is notably much smaller in size compared to TxPIC 20, e.g., as much as about 2.5 times smaller in chip area. Chip 30 includes, in the example illustrated here, N=10 signal channels each comprising a modulated source 12 and 14 with front photodetector 18 and rear photodetector 12. As indicated previously, N may be any other value that is physically and economically feasible for placement on a monolithic chip. However, instead of utilizing an AWG 24 as an on-chip multiplexer, an elliptical supergrating 32 is utilized and comprises a plurality of subsets of elliptical gratings where each subset has a grating period, $\Lambda_n$, for reflecting the linewidth of a given peak wavelength of each respective laser source 12 of optical channels 1 to 10 according to the equation, $$\lambda_n = 2n\Lambda_n.$$

Supergrating multiplexer 32 is made by cascading a series of elliptically-shaped mirrors which are referred to in this disclosure as sets of subgratings 32A where each N set for N signal channels has a different grating period, $\Lambda_n$. Each set of gratings is reflective for the wavelengths within the stop band of the subgratings which may be, for example, about 1.2 nm. The stop band of a set of subgratings may be made to overlap employing a phase shift in the grating, as is known in the art, so that the stop band may be broadened to about 1.6 nm.

In FIG. 2, the representation of these subsets of gratings is a single elliptical line 32A, and, therefore, there are N=10 such subgrating sets or groups 32A. Each of these subgratings sets 32A are comprised of etched grooves in a grating layer 42A (FIG. 4) of the epitaxial grown structure comprising TxPIC 30, which will be explained in more detail later. There is a free space region 31 wherein the modulated output from the respective ten channels enters into and the respective modulated outputs of the N channels are permitted to expand (diverge as in a point source), such as indicated at 31A. Then, these modulated beams respectively encounter a particular elliptical subgrating set 32A having grating period, $\Lambda_n$, that substantially matches the peak wavelength, $\lambda_n$, of a respective beam and, as a result, the beam is totally, internally reflected by the elliptical subgrating set and refocused to a common output 34 which is the input end of the chip central output waveguide 35, such as indicated by arrows 31A and 31B. The advantages of this design are that beside being more compact than the deployment of an AWG 24, the path lengths are more uniformly the same from end of the channel array to the other with the output waveguide 35 preferably in the center between the split groups of signal channels, i.e., between channel 5 and channel 6. Characterized this with the AWG 24 where one of the paths or grating arms 27 that is the longest suffers the most insertion loss than the other AWG arms which are all shorter than this longest arm. As a result, the power among the channel signals at the output of the AWG will not be uniform. However, in the case of supergrating 32 and the architecture of FIG. 2, the path lengths of each of the N channels to supergrating and back are substantially smaller than the path lengths in a corresponding AWG. In an AWG 24 (FIG. 1), these path lengths can be as long as 7 mm whereas in supergrating 32, the path lengths are in the neighborhood of 1.8 mm. Having said the foregoing, it should be noted that the output 35, instead of being in the center of chip 30, may be positioned at any location of any one of the N channels in spite greater change in the respective path lengths, in which case they still would not be as long as the curved path lengths in AWG 24. However, the preferred embodiment is to place the TxPIC output waveguide 35 at the center of the chip because the power loss is minimized in this configuration because there are less propagation path lengths for the light in each case to travel to a common output. However, this embodiment is not infinitely scalable so that there is a limit to how many signal channels can be formed on the chip since eventually the path lengths of the outer most channels will become too long and provide a significant penalty compared to the inner most signal channels in proximity to on-chip waveguide output 35.

Figure 3:
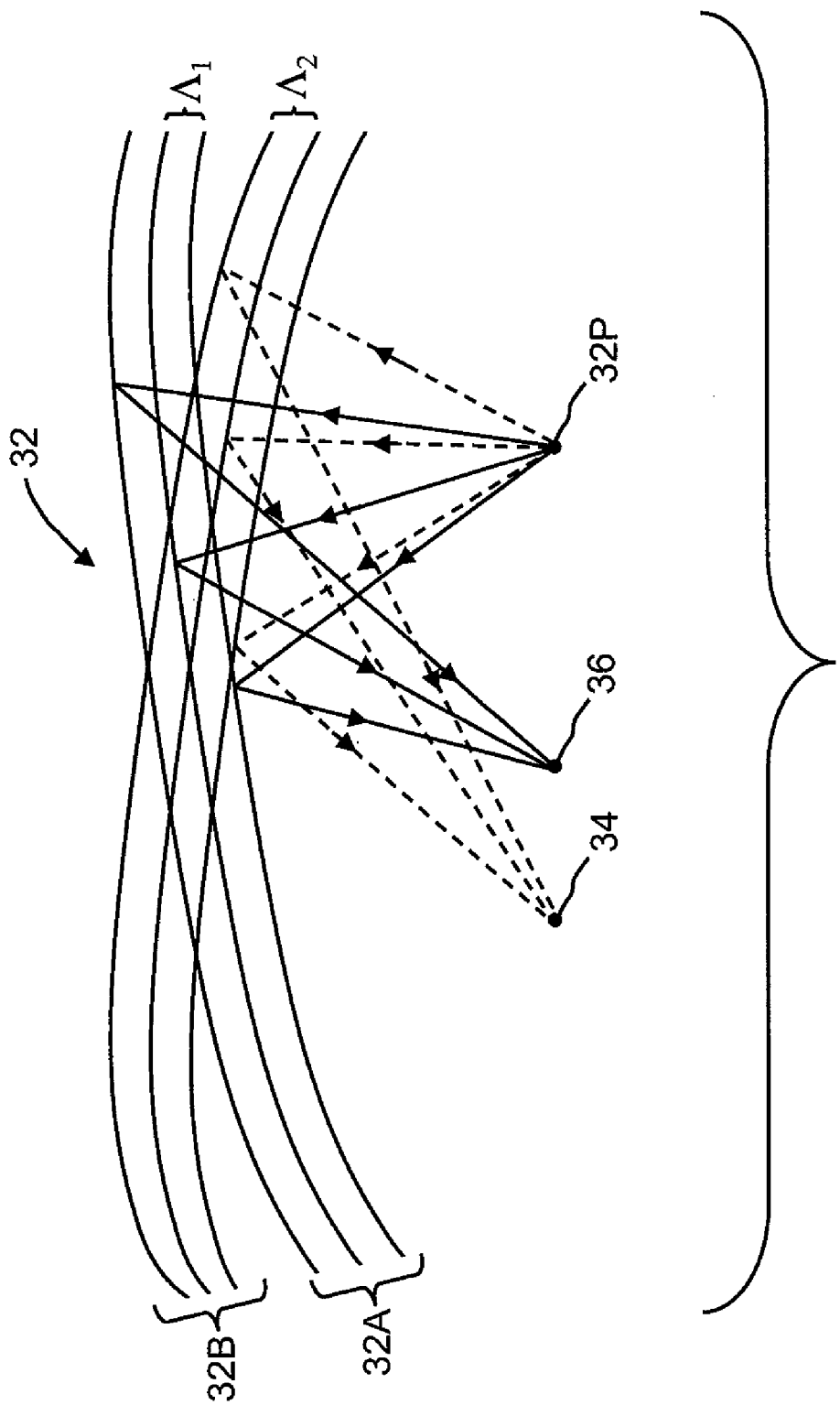
FIG. 3 is a diagrammatic view for the explaining of two different wavelength light beams interacting with two different subgrating sets of an elliptical supergrating.

In FIG. 3, a simple example of an elliptical supergrating 32 is shown consisting of two subgrating sets 32A and 32B are shown where each subset comprises three subgratings having different grating periods, $\Lambda_1$ and $\Lambda_2$. In practice, however, such subgrating sets may have 100 to several 1,000 of such subgratings in each set. The subgrating groups 32A and 32B are angularly disposed relative to elliptical focal point 32P to provide, upon reflection, respective focal points 36 and 34 adjacent to elliptical focal point 32P. As seen in this figure, light diverging from point 32P having a wavelength $\lambda_1$ will be reflected from the subgrating set 32A having a period, $\Lambda_1$, and is refocused to point 36. On the other hand, light diverging from point 32P having a wavelength $\lambda_2$ will be reflected from the subgrating set 32B having a period, $\Lambda_2$, and is refocused to point 34. Of course the opposite is true in the case where point (laser) sources would be at points 34 and 36 and are refocused to common output port or waveguide at point 32P as would be the case for TxPIC 30 in FIG. 2.

FIG. 4 is a cross-sectional side elevation of TxPIC chip 30 in FIG. 2 at line 4-4 except that for purposes of simplicity, photodetectors 12 and 18 are not included in either view. Also, a completed epitaxial structural layered device is not shown in that only the layers up to the active region of the PIC are illustrated. More details of these devices can be seen in previously incorporated U.S. patent applications. As shown in FIG. 6, chip 30 comprises a substrate 40, which may be InP, followed by grating layer 42 of AQ or PQ. There may be an intervening buffer and cladding layer of InP between substrate 40 and grating layer 42. This completes an initial MOCVD epitaxial growth step whereupon DFB gratings 42A for laser sources 14 are formed using conventional techniques such as photolithography with dry or wet etching, e-beam writing, or holographic beam writing to form the gratings with their proper grating pitch or period, $\Lambda_n$, for each of the respective laser sources 14. Each different period, $\Lambda_n$, provides for a different operational wavelengths that correspond or approximate the wavelengths along a standardized waveguide such as the ITU grid in the C band or L band, for example. Concurrently with the forming of these laser source gratings, the supergrating 42B is corresponding produce in this same step in combiner region 32 where the sets of subgratings 32A are formed by the same processes with proper grating pitch or period, $\Lambda_n$, where $\lambda_n = 2n\Lambda_n$ to form an elliptical supergrating 32. This grating process is followed by the formation of layer 43 such as, for example, InP, which provides the differential modulated refractive index, n, for these gratings to perform substantially total internal reflection at the prescribed wavelengths $\lambda_n$. The epitaxial growth of layer 43 is followed by the growth of active region 44 which may be comprised of multiple quantum wells and barriers of AQ or PQ as known in the art. This is followed by the epitaxial growth of a confinement layer 45 of InP, for example, as well as other layers, such as a stop etch layer, cladding layer and cap layer. The advantage of deploying supergrating 32 at 42B as an optical combiner is that it may be fabricated concurrently with the laser source gratings 42A which is not true for an AWG type optical combiner. With an AWG, the active region 44 over combiner region 32 may preferably be removed and regrown to have an appropriate refractive index to be more transparent to the generated channel signal wavelengths. This is regrowth step is not necessary when deploying a supergrating as the optical combiner. Also, as previously mentioned, supergrating 32 does not require as much real estate on chip 30 to perform the same functions as an AWG 24 (FIG. 1).

In FIGS. 2 and 3, supergrating 32 is illustrated as series of continuous elliptical shaped arcs. However, as know in the art, these gratings may be dashed-line gratings as illustrated for the sets of subgratings 46 in FIG. 5. Also, intersections or crossing points 46A of the different sets of subgratings 46 may be provided such that one set is provided with opened spaces 46A at these intersections relative to another set of subgratings 46 so that there is no lined crisscross or sharp points at these subgrating intersections causing undesired destructive interference including crosstalk. As an example, these open intersections 46A at grating crossings may be, for example, about 5 μm. In this manner, less optical interference, such as crosstalk, is created between adjacent subgrating sets, caused by destructive light interference at these crosspoints, resulting in better combiner performance. The depth of the gratings may be, therefore, in this embodiment as well in the embodiment of FIG. 6 a little deeper compared to the depth of the laser source gratings, such as, for example, about 90 μm deep whereas the laser source gratings are approximately 50 μm deep.

Such reduced optical destructive interference can also be reduced in solid line subgratings 32A as illustrated in FIG. 6 where the intersections 47 are opened spaces with no grating. This can be performed employing e-bream writing of these gratings by discontinuing the subgratings at crisscross points 47. While this may enhance combiner optical losses, a substantial portion of the respective wavelength signals forming the multiplexed output signal beam will undergo internal reflection by the multiple subgratings relative to each such set of subgratings producing a multiplexed output signal beam. In this connection, a gain-clamped semiconductor optical amplifier (GC-SOA) or semiconductor optical amplifier (SOA) may be provided in the output waveguide 35 of chip 30 or optionally an optical amplifier may be employed at the output of chip 30, such as, for example, an EDFA.

Reference is now made to FIG. 7 which shows the typical layout for a monolithic receiver photonic integrated circuit (RxPIC) chip 50. It should be noted that RxPIC chip 50 is just one embodiment of many that may be employed in a digital optical transmission network. See, for example, the different embodiments illustrated in U.S. patent application, Ser. No. 10/267,304, supra. In this embodiment, provision is made for an on-chip integrated optical amplifier (OA) 52 on RxPIC chip 50, such as a semiconductor optical amplifier (SOA) or a gain-clamped semiconductor optical amplifier (GC-OA). Optical amplifier (OA) 52 may be integrated on the chip to boost the gain of the multiplexed signal prior to demultiplexing. Such amplification can alternatively be done off-chip with an optical fiber amplifier, such as with an EDFA, prior to the input of signal into on-chip waveguide 51. RxPIC 50 may be an InP-based semiconductor chip that has an input at waveguide 51 to receive a multiplexed optical signal such as from an optically coupled fiber link. The multiplexed signal received in chip waveguide 51 is provided as an input to decombiner 54 which is an AWG demultiplexer 54. The multiplexed signal is provided to input slab or free space region 56A of AWG 54. AWG 54 comprises input slab 56A, an array of grating waveguides or arms 54A of different lengths and an output slab 56B as known in the art. Output slab 56B has a plurality of output waveguides 57 in the zero order Brillouin zone, one for each demultiplexed channel wavelength signal, which are respectively provided to PIN photodiodes 59(1) . . . 59(12). Although there are twelve channels shown here for chip 40, there may be less than or more than twelve such channel signal outputs from AWG 54 to corresponding photodetectors 59. The photocurrents developed in photodetectors 59 are taken off-chip to a TIA circuit, as known in the art, to produce modulated voltage signals that correspond to the demultiplexed and detected optical signals.

Reference is now made to FIGS. 8 and 9 which disclose an embodiment comprising this invention comprising RxPIC chip 60 having an input waveguide 61 for receiving a multiplexed optical signal from an optical link. Waveguide 61 is coupled to a free space region 63 for directing the incoming multiplexed optical signal to supergrating 64 comprised of a sets of subgratings 64A which function in the same manner as supergrating 32 in TxPIC 30 of FIG. 2 except that, here, the multiplexed signal in waveguide 61 is demultiplexed and the individual demultiplexed, modulated channel signals are reflected back to focal points comprising waveguides containing photodetectors 62(1) . . . 62(10) or can be focused directly to inputs of these photodetectors themselves. Photodetectors 62 may be, for example, PIN photodiodes or an avalanche photodiodes. The photocurrent signals produced by photodetectors 62 are then taken off-chip for electronic processing. Supergrating 64 is made in the same manner as previously explained for supergrating 32 and also can have the configurations as disclosed and explained in connection with FIGS. 5 and 6. FIG. 9 is an illustration of a side elevation of RxPIC 60 which may be comprises of a substrate 65, such as InP, followed by a cladding layer 66, such as, for example, of InP, followed by grating layer 67, such as, for example, comprising AQ or PQ, followed by space layer 68 of InP, followed by active core layer 69, such as, for example, comprising AQ or PQ, followed by light absorption layer 60A for photodetectors 62(N) which may be, for example, comprised of PQ which is larger than core layer 68 to function as a carrier mass transport layer. Layer 60A may then be followed by a cladding layer and a cap layer (not shown). Upon completion of the epitaxial growth, the region of supergrating 64 is etched back, as indicated at 60B, and supergrating 64 may be formed in the manner as previously explained wherein grooves or troughs forming the groups or sets of subgratings 64A are formed or written into grating layer 67 at region 67A. The advantage in deploying supergrating 64 in lieu of AWG 54 in an RxPIC is that the area of the chip can be made significant smaller with the deployment of a supergrating demultiplexer 64 compared to that required for an AWG demultiplexer 54. Thus, the package for RxPIC chip 60 can be made smaller or more IC chips, such as TIA IC chip or AGC IC chip can be placed within the same package as RxPIC chip 60 with package leadout pins for coupling to inputs of an TIA/AGC chip as well as pins for bias leads for operating photodetectors 62(1) . . . 62(10).

Figure 10:
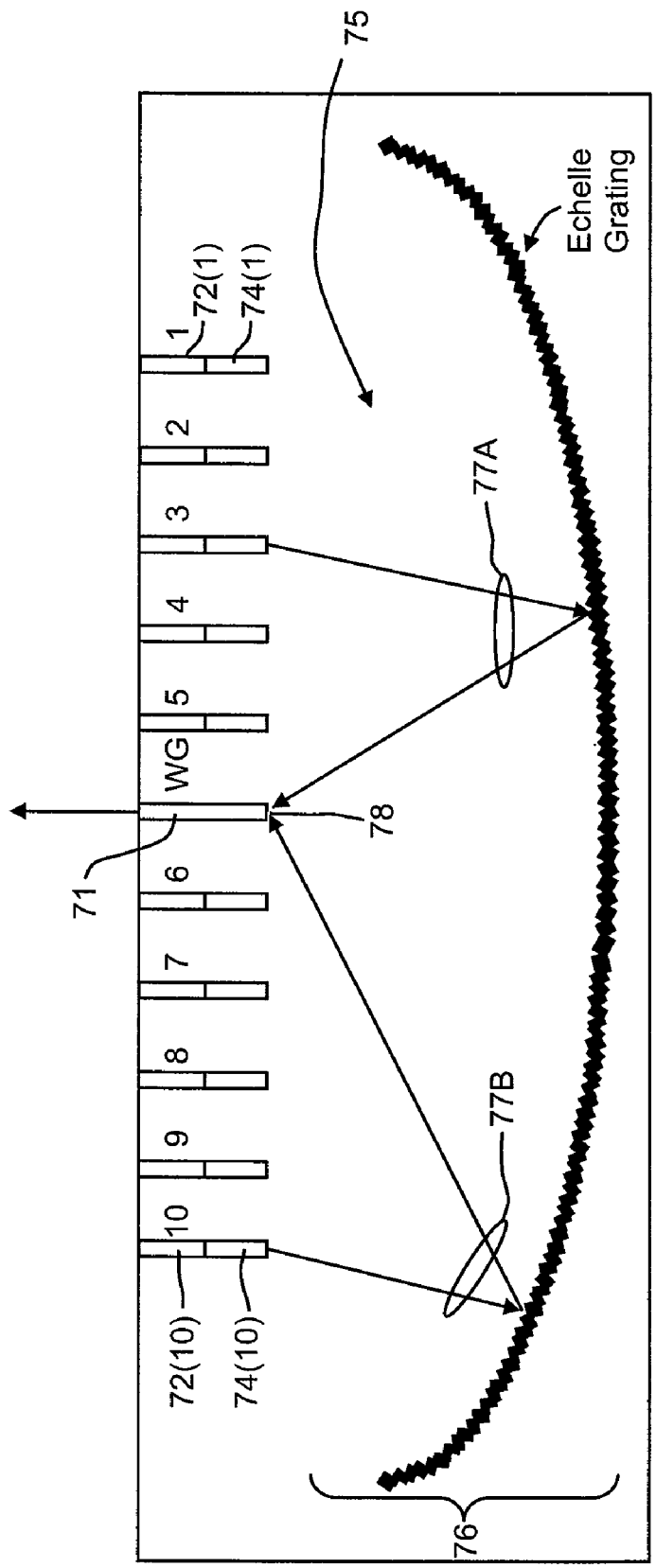
FIG. 10 is a plan view of a TxPIC chip utilizing an integrated Echelle grating as an on-chip demultiplexer comprising this invention.

FIG. 10 illustrates another embodiment of this invention comprising TxPIC 70 comprising N=10 signal channels comprising laser sources 72(N) and associated modulators 74(N) and a center channel output waveguide 71. Chip 70 in FIG. 10 is notably much smaller in size compared to TxPIC 10 in FIG. 1, e.g., as much as about 1.5 times smaller in chip area. In the embodiment here, the optical combiner comprises an Echelle grating 76, as shown in FIG. 10, rather than an AWG 24 as shown in FIG. 1. The outputs of modulators 74(1) . . . 74(10) are separated from Echelle grating by free space region where the respective channel signals from the modulators are permitted to diverge in region 75, as illustrated by arrows 77A and 77B, and then all reflected by Echelle grating 76 and refocused to a common output point 78 at output waveguide 71 for exit from chip 70 as a multiplexed optical signal comprising 10 channel signals.

FIG. 11 illustrates RxPIC chip 80 which illustrate a decombiner comprising an Echelle grating 84 functioning in a manner as illustrated in U.S. Pat. No. 6,339,662, which patent is incorporated herein by its reference. Echelle grating 84 differs from that patent in that a photodetector array 87(N) is integrated on chip 80. Also, and importantly, Echelle grating 84 is etched into chip 80 via etched region 85 so that free space region 82 is a slab comprising a waveguide core formed in chip 80 such as AQ or PQ region in an InP-based chip. In this manner, a high performance reflecting surface 83 may easily be deposited on the external face of grating 84, such as gold or a dielectric stack, for example, a six-layer dielectric stack to provide a high quality mirror surface as known in the art. Also, exposed grating surface 83 must be very perpendicular relative to the plane of the waveguide core of RxPIC 80 chip, such as, for example, within ±0.2° relative to 90° from the horizontal plane of the as-grown epitaxial layers; otherwise, the light will be reflected up or down out of free space region 82. Etching along an outside edge, rather then an inside edge, in forming Echelle grating 84 is preferable for this reason too. Photodetectors 87(1) . . . 87(10) may be formed in the InP-based chip 80 as PIN photodiodes or avalanche photodiodes as taught in the previously incorporated application, Ser. No. 10/256,304 and in U.S. application publication No. 2003/0165314, published on Sep. 4, 2003, which publication is owned by the assignee herein and is incorporated herein by its reference. RxPIC chip 80 includes input waveguide 81 along one edge of the array waveguide 86. An incoming multiplexed signal in waveguide 81 diverges as it enters into free space region 82 and is reflected as well as diffracted by the grating so that different wavelength components of the multiplexed signal are directed and focused to the inputs 86A of respective waveguides 86. Thus, the first of such waveguides 86(1) may receive a channel signal, $\lambda_1$, which is directed through waveguide 86 to photodetector 87(1). It should be noted that in order to make chip 80 smaller, waveguides 86 may be provided with 90 degree angular corners 89 rather than use a fan-out of waveguides as shown in the embodiment of FIG. 7. In this case, 45° mirrors may be etched at corners 89 for directing the light around these 90° waveguide comets and onto photodetectors 87. Each photodetector 87(N) may also have a corresponding output pad 88 for taking off-chip the photocurrents produced by photodetectors 87(N). The foregoing Echelle grating structure can also be employed in other embodiments of this invention, TxPIC and RxPIC alike.

Reference is now made to FIGS. 12 and 13 which show different versions of Echelle gratings that may be deployed with this invention. A shown in FIG. 12, the Echelle grating may be comprised of a series of flat etched steps 83A or as shown in FIG. 13, may be a series of angular steps 83B where, in each case, the diverging multiplexed beam is diffracted and reflected back as individual focused beams having different peak wavelengths.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A photonic integrated circuit chip comprising:
    a substrate;
    a plurality of semiconductor layers provided on the substrate;
    a wavelength selective decombiner provided on a first one of the plurality of semiconductor layers, the wavelength selective decombiner including first and second elliptical gratings, the first elliptical grating being configured to intersect the second elliptical grating at a plurality of open regions where the first and second elliptical gratings are discontinuous, the wavelength selective decombiner configured to receive a multi-wavelength signal and demultiplex the multi-wavelength signal into a plurality of signal channels; and
    a plurality of waveguides provided on a second one of the plurality of semiconductor layers, a first of the plurality of waveguides configured to receive a first of the plurality of signal channels from the first elliptical grating and a second of the plurality of waveguides configured to receive a second of the plurality of signal channels from the second grating.

2. The photonic integrated circuit chip of claim 1 further comprising an input waveguide coupled to the wavelength selective decombiner, the input waveguide configured to receive the multi-wavelength signal as an input to the photonic integrate circuit chip and provide the multiplexed multi-wavelength signal to the wavelength selective decombiner.

3. The photonic integrated circuit chip of claim 2 further comprising first and second photodetectors provided on the substrate, the first photodetector being coupled to the first of the plurality of waveguides to receive the first of the plurality of signal channels, and the second photodetector being coupled to the second of the plurality of waveguides to receive the second of the plurality of signal channels.

4. The photonic integrated circuit chip of claim 3, wherein the first and second photodetectors are PIN photodiodes or avalanche photodiodes.

5. The photonic integrated circuit chip of claim 3, wherein the first one of the plurality of semiconductor layers is a grating layer, a third one of the plurality of semiconductor layers is an active layer, and a fourth one of the plurality of semiconductor layers is a carrier mass transport layer, each of the plurality of photodetectors including a corresponding one of a plurality of portions of the active layer located above a corresponding one of a plurality of portions of the grating layer, and a portion of the carrier mass transport layer provided above the corresponding one of the plurality of portions of the active layer.

6. The photonic integrated circuit chip of claim 5 wherein the fourth one of the plurality of semiconductor layers includes InGaAsP.

7. The photonic integrated circuit chip of claim 2, wherein the input waveguide is provided substantially parallel to and positioned between a first one of the plurality of waveguides and a second one of the plurality of waveguides.

8. The photonic integrated circuit chip of claim 2, wherein the input waveguide is formed substantially parallel to and positioned between a first group and a second group of the plurality of waveguides, a number of waveguides in the first group of the plurality of waveguides being equal to a number of waveguides in the second group of the plurality of waveguides.

9. The photonic integrated circuit chip of claim 2 further comprising an input facet, wherein the input waveguide terminates at the input facet.

10. The photonic integrated circuit chip of claim 1, wherein the first of the plurality of semiconductor layers is a grating layer.

11. The photonic integrated circuit chip of claim 1, wherein the first elliptical grating includes a first plurality of troughs and the second elliptical grating includes a second plurality of troughs, the first and second elliptical gratings being configured to direct one of the plurality of signal channels to a corresponding one of the plurality of waveguides.

12. The photonic integrated circuit chip of claim 11, wherein each of the first plurality of troughs is spaced from one another by a first period and each of the second plurality of troughs is spaced from one another by a second period.

13. The photonic integrated circuit chip of claim 1, wherein the first and second one of the plurality of semiconductor layers include InGaAsP or AlInGaAs.

14. A photonic integrated circuit chip comprising:
a substrate;
a plurality of semiconductor layers provided on the substrate;
an input waveguide provided on the substrate, the input waveguide coupled to an input of the photonic integrated circuit chip;
a wavelength selective decombiner provided on a first one of the plurality of semiconductor layers, the wavelength selective decombiner including an elliptical supergrating configured to receive a multi-wavelength signal from the input waveguide and demultiplex the multi-wavelength signal into a plurality of signal channels;
a plurality of waveguides provided on a second one of the plurality of semiconductor layers, each of the plurality of waveguides configured to receive a corresponding one of the plurality of signal channels; and
a plurality of photodetectors provided on the substrate, each of the plurality of photodetectors being coupled to a respective one of the plurality of waveguides to receive a corresponding one of the plurality of signal channels,
wherein the first one of the plurality of semiconductor layers is a grating layer, a third one of the plurality of semiconductor layers is an active layer, and a fourth one of the plurality of semiconductor layers is a carrier mass transport layer, each of the plurality of photodetectors including a corresponding one of a plurality of portions of the active layer located above a corresponding one of a plurality of portions of the grating layer, and a portion of the carrier mass transport layer provided above the corresponding one of the plurality of portions of the active layer.

15. The photonic integrated circuit chip of claim 14 wherein the fourth one of the plurality of semiconductor layers includes InGaAsP.

* * * * *